United States Patent
Kang

(10) Patent No.: US 7,403,253 B2
(45) Date of Patent: Jul. 22, 2008

(54) PLANE SWITCHING MODE LIQUID CRYSTAL DISPLAY DEVICE HAVING STORAGE LINES OVERLAPPING GATE LINE AND COMMON LINE, AND FABRICATION METHOD THEREOF

(75) Inventor: Won-Seok Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 361 days.

(21) Appl. No.: 10/975,100

(22) Filed: Oct. 28, 2004

(65) Prior Publication Data
US 2005/0094078 A1  May 5, 2005

(30) Foreign Application Priority Data
Oct. 29, 2003 (KR) .................. 10-2003-0076080

(51) Int. Cl.
*G02F 1/1343* (2006.01)
(52) U.S. Cl. .................. 349/141; 349/39
(58) Field of Classification Search .......... 349/141, 349/145, 146, 109
See application file for complete search history.

(56) References Cited

U.S. PATENT DOCUMENTS

| | | | |
|---|---|---|---|
| 5,757,452 A * | 5/1998 | Masaki et al. ........ 349/110 |
| 5,777,707 A | 7/1998 | Masaki et al. | |
| 6,356,331 B1 | 3/2002 | Ono et al. | |
| 7,164,402 B2 | 1/2007 | Yanagawa et al. | |
| 2002/0057411 A1* | 5/2002 | Kim et al. ........... 349/141 |
| 2002/0093614 A1* | 7/2002 | Moon et al. .......... 349/141 |
| 2002/0159016 A1* | 10/2002 | Nishida et al. ........ 349/141 |
| 2003/0107037 A1* | 6/2003 | Youn et al. ........... 257/59 |
| 2004/0109122 A1 | 6/2004 | Kumagawa et al. | |
| 2005/0094077 A1* | 5/2005 | Baek ................. 349/141 |
| 2005/0128413 A1* | 6/2005 | Son et al. ............ 349/143 |

FOREIGN PATENT DOCUMENTS

| | | |
|---|---|---|
| CN | 1366206 | 8/2002 |
| CN | 1392965 | 1/2003 |
| JP | 04-355722 | 12/1992 |
| JP | 09-090343 | 4/1997 |
| JP | 10-123482 | 5/1998 |

(Continued)

*Primary Examiner*—Andrew Schechter
(74) *Attorney, Agent, or Firm*—McKenna, Long & Aldridge LLP

(57) ABSTRACT

An IPS mode LCD device and its fabrication method are disclosed. The IPS mode LCD device includes: first and second substrates; a plurality of gate lines and data lines disposed horizontally and vertically on the first substrate; a plurality of sub-pixels defined by the gate lines and the data lines; a common line dividing the sub pixels into an upper region, a first region and a lower region, a second region, and defining first to fourth sub-pixels arranged in a 2×2 matrix form; at least one pair of a common electrode and a pixel electrode disposed in each of first to fourth sub-pixels and generating an in-plane electric field; a first storage line connected to the pixel electrode of the first region and disposed on the gate line; a second storage line connected to the pixel electrode of the second region and disposed on the common line; a switching device formed at an intersection of the gate line and the data line; and a liquid crystal layer formed between the first and second substrates.

18 Claims, 10 Drawing Sheets

FOREIGN PATENT DOCUMENTS

| | | |
|---|---|---|
| JP | 2001-091972 | 4/2001 |
| JP | 2001-296523 | 10/2001 |
| JP | 2002-023185 | 1/2002 |
| JP | 2002-169179 | 6/2002 |
| JP | 2002-202736 | 7/2002 |
| JP | 2003-280037 | 10/2003 |

* cited by examiner

PLANE SWITCHING MODE LIQUID CRYSTAL DISPLAY DEVICE HAVING STORAGE LINES OVERLAPPING GATE LINE AND COMMON LINE, AND FABRICATION METHOD THEREOF

This application claims the benefit of Korean Patent Application No. 2003-76080, filed on Oct. 29, 2003, which is hereby incorporated by reference for all purposes as if set forth herein.

BACKGROUND OF THE INVENTION

1. Field of the Invention

The present invention relates to an in plane switching mode liquid crystal display device, and particularly, a quad type in plane switching mode liquid crystal display device and its fabrication method capable of improving an aperture ratio.

2. Discussion of the Related Art

A twisted nematic (TN) mode liquid crystal display (LCD) device, which is commonly used as a flat panel display device achieving high image quality and low power consumption, has a problem in that its viewing angle is narrow because of refractive anisotropy of its liquid crystal molecules. This is because the liquid crystal molecules are aligned parallel to a substrate in the absence of a voltage and are aligned almost perpendicularly to the substrate when a voltage is applied.

To overcome this deficiency, present research includes active development of an in plane switching (IPS) mode LCD for solving the viewing angle problem by aligning liquid crystal molecules almost parallel to a substrate.

FIG. 1 is a schematic view of a unit pixel of a general IPS mode LCD device of the related art, wherein FIG. 1A is a plan view, and FIG. 1B is a cross sectional view taken along line I-I' of FIG. 1A.

As illustrated in FIGS. 1A and 1B, Red (R), Green (G) and Blue (B) sub-pixels construct one unit pixel, and each sub-pixel is defined by a gate line 1 and a data line 3 arranged horizontally and vertically on a transparent first substrate 10. As used hereinafter, the horizontal direction corresponds to the orientation of the gate line; and the vertical direction, which is perpendicular to the horizontal direction, corresponds to the orientation of the data line. Both the vertical and horizontal directions are parallel to the surface of the substrate. Although the n×m number of sub-pixels are defined by the 'n' number of gate lines 1 and the 'm' number of data lines 3 in an LCD device, only one set of R, G and B sub-pixels are illustrated here. As used hereinafter, the R, G and B sub-pixels combine to form a unit pixel.

A thin film transistor 9 of the related art is disposed at a crossing of the gate line 1 and the data line 3 defining the sub-pixel. The thin film transistor 9 includes a gate electrode 1a, a semiconductor layer 5 and source/drain electrodes 2a, 2b.

In the sub-pixel of the related art, a common line 4 is arranged parallel to the gate line 1, and at least one pair of electrodes, a common electrode 6 and a pixel electrode 7, are arranged parallel to the data line 3. The electrodes are for switching the liquid crystal molecules. Here, the common electrode 6 and the pixel electrode 7 are respectively connected to the common line 4 and the drain electrode 2b. A passivation layer 11 and a first alignment film 12a are further applied on the first substrate 10 having the source electrode 2a and the drain electrode 2b.

In addition, a pixel electrode line 14, which overlaps the common line 4 and is connected to the pixel electrode 7, forms a storage capacitor with the common line 4, wherein the pixel electrode line 14 and the common line 4 have a gate insulation layer disposed between them.

A black matrix 21 for preventing leakage of light, and R, G and B color filters 23a-23c respectively corresponding to the sub-pixels, is formed on the second substrate 20. Additionally, a second alignment film 12b, which along with the first alignment film 12a determines an initial alignment state of the liquid crystal, is applied to the second substrate 20.

According to an IPS pixel structure of the related art, the liquid crystal layer 13, which is formed between the first substrate 10 and second substrate 20, transmits light according to a voltage applied between the common electrode 6 and the pixel electrode 7.

The related art IPS mode LCD device having such a structure is advantageous in that a viewing angle can be improved because a common electrode and a pixel electrode are disposed on the same plane and thus generate an in-plane electric field. However, the related art IPS mode LCD device has problems in that an aperture ratio is decreased, and its brightness is degraded because the common electrode 6 and the pixel electrode 7 are disposed in a pixel region where light would otherwise be transmitted to form an image.

SUMMARY OF THE INVENTION

Accordingly, the present invention is directed to an in plane switching mode liquid crystal display device and fabrication method thereof that substantially obviates one or more of the problems due to limitations and disadvantages of the related art.

An advantage of the present invention is to provide an IPS mode LCD device capable of improving brightness of a screen by constructing Red (R), Green (G), Blue (B) and White (W) sub-pixels as one pixel.

Another advantage of the present invention is to provide an IPS mode LCD device capable of effectively improving an aperture ratio by disposing four sub-pixels of R, G, B and W in a quad type (2×2 arrangement).

Another advantage of the present invention is to provide an IPS mode LCD device and its fabrication method capable of easily controlling areas of sub-pixels by disposing a common line between the sub-pixels disposed vertically and thus making two-sub-pixels share the common line.

In order to achieve these and other advantages of the invention, an in plane switching mode liquid crystal display device comprises a first substrate and a second substrate; a plurality of gate lines disposed horizontally on the first substrate; a plurality of data lines disposed vertically on the first substrate, the gate lines and data lines defining a pixel region; a common line between the gate lines, the common line dividing the pixel region into a first region and a second region, and defining a first to a fourth sub-pixels arranged in a 2×2 matrix form within the pixel region; at least one pair of a common electrode and a pixel electrode disposed in each of the sub-pixels; a first storage line connected to the pixel electrode of the first region and disposed on the gate line; a second storage line connected to the pixel electrode of the second region and disposed on the common line; a switching device formed at an intersection of the gate line and the data line; and a liquid crystal layer formed between the first and the second substrates.

In order to achieve these and other advantages of the invention, an in plane switching mode liquid crystal display device comprises a first substrate and a second substrate; a plurality of gate lines disposed horizontally on the first substrate; a plurality of data lines disposed vertically on the first substrate, the gate lines and the data lines defining a pixel region; a common line dividing the pixel region into a first region and a second region, and defining Red (R), Green (G), Blue (B) and White (W) sub-pixels arranged in a 2×2 matrix form; at least one pair of a common electrode and a pixel electrode disposed in each of sub-pixels; a first storage line disposed on the gate line; a second storage line disposed on the common line; a first contact hole electrically connecting the common electrode to the common line; a second contact hole electrically connecting the pixel electrode of the first region to the first storage line; a third contact hole electrically connecting the pixel electrode of the second region to the second storage line; a switching device formed at an intersection of the gate line and the data line; and a liquid crystal layer formed between the first and the second substrates.

In order to achieve these and other advantages of the invention, a fabrication method of an in plane switching mode liquid crystal display device comprises providing a first substrate and a second substrate; forming a plurality of gate lines and a common line parallel to and between the gate lines; forming a plurality of data lines disposed perpendicularly to the gate lines and defining R, G, B, and W sub-pixels together with the gate lines and the common line; a first storage line overlapping a gate line within the plurality of gate lines and forming a first storage capacitor; and a second storage line overlapping the common line and forming a second storage capacitor; forming a passivation layer on an entire surface of the substrate including the first and second storage lines; and forming a common electrode and a pixel electrode on the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the embodiments of the present invention, examples of which are illustrated in the accompanying drawings.

Figure 2:
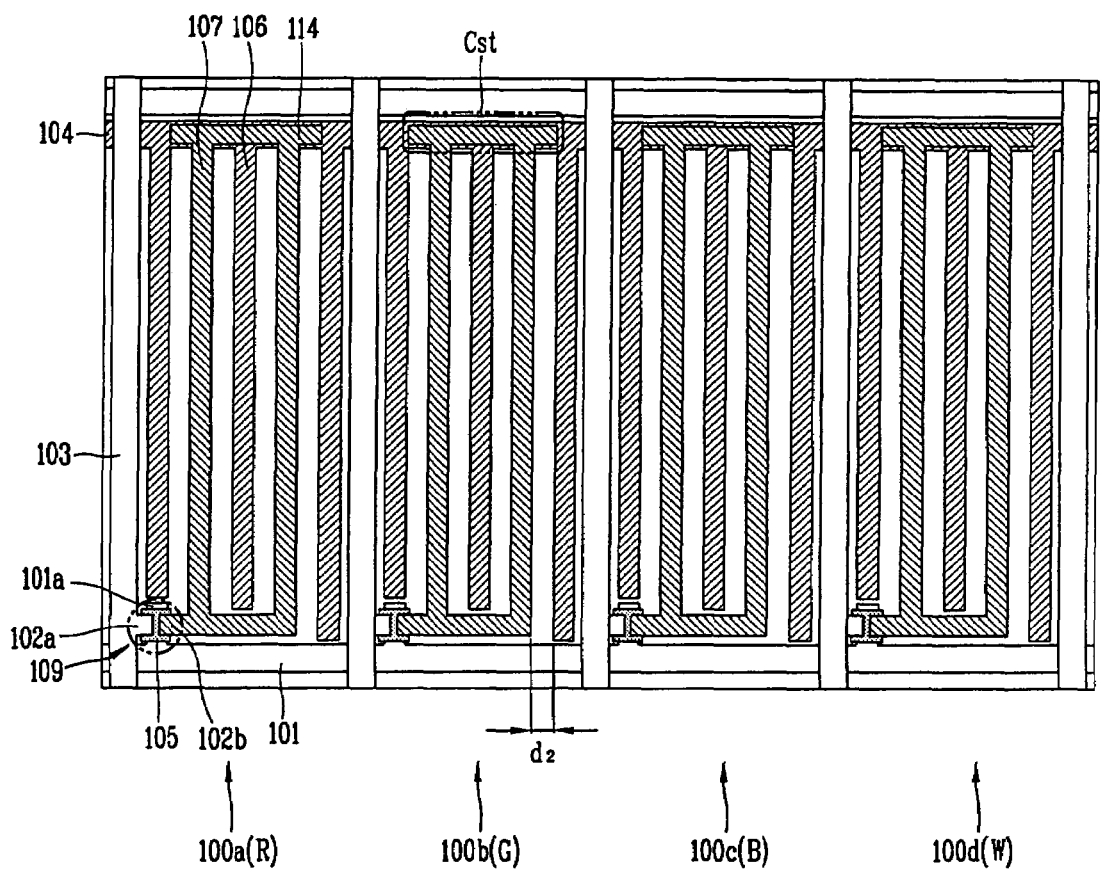
FIG. 2 is a view of an IPS mode LCD device according to a first embodiment of the present invention.

FIG. 2 illustrates a first embodiment of the present invention: an in plane switching (IPS) mode liquid crystal display (LCD) device having four sub-pixels, wherein each sub-pixel has four transmissive regions. This embodiment of the IPS mode LCD device has a white sub-pixel 100d in addition to the Red 100a, Green 100b and Blue 100c sub-pixels. Here, the W sub-pixel 100d may be accommodated by reducing the width of each sub-pixel and maintaining each sub-pixel's area.

The sub-pixels 100a, 100b, 100c and 100d are defined by a gate lines 101 and a data lines 103 arranged horizontally and vertically. In each sub-pixel 100a, 100b, 100c, 100d, a pixel electrode 107 substantially perpendicularly connects to a pixel electrode line 114, and a common electrode 106 substantially perpendicularly connects to a common line 104. The pixel electrode 107 and the common electrode 106, which are alternately disposed, generate an in-plane electric field in the pixel when a voltage is applied between them. In addition, the common line 104 and the pixel electrode line 144 may overlap each other and form a storage capacitor (Cst) with a gate insulation layer (not shown) between them.

Also, as a switching device, a thin film transistor 109 may be disposed at the crossing of the gate line 101 and data line 103. The thin film transistor 109 generally includes a semiconductor layer 105 formed on the gate electrode 101a; a source electrode 102a formed on the semiconductor layer 105; and a drain electrode 102b facing the source electrode 102a and electrically connected to the pixel electrode line 114. Also, although not shown in the drawing, a gate insulation layer may be applied on an entire surface of the substrate on which the gate line 101 has been formed. The gate insulation layer electrically insulates the common electrode 106 and the pixel electrode 107 from each other.

Figure 1A:
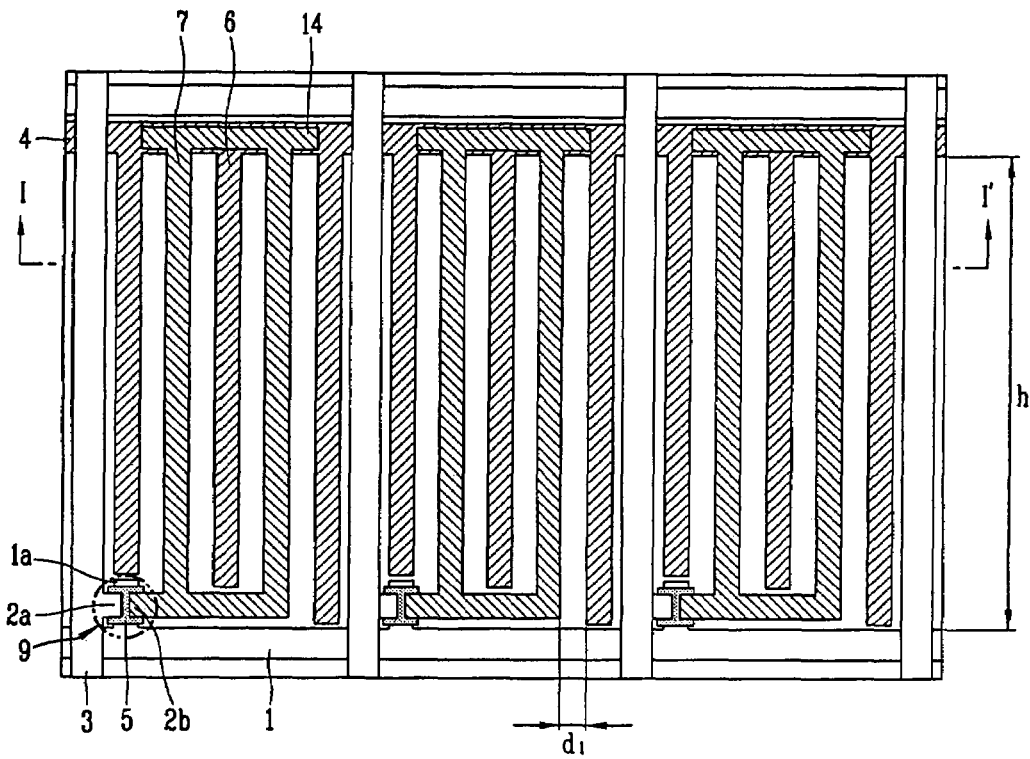
FIGS. 1A and 1B illustrate a structure of a related art IPS mode LCD device.
Figure 1B:
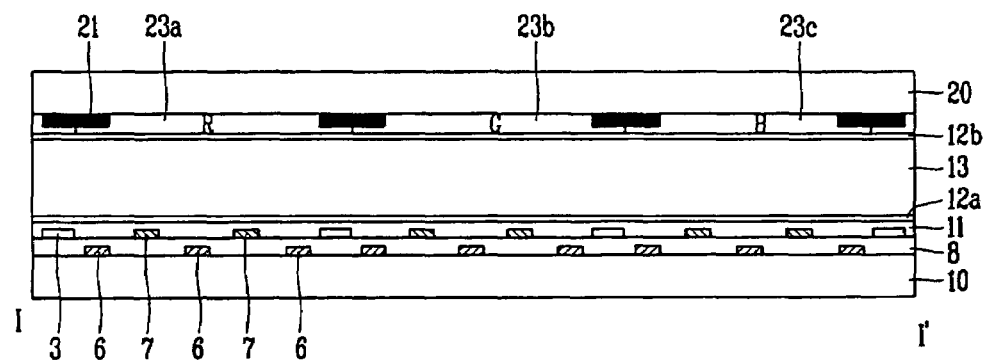

The following is a comparison between the first embodiment of the present invention and the related art. As illustrated in FIG. 1A, a separation distance between the pixel electrode 7 and the common electrode 6 is defined as d1. As illustrated in FIG. 2, the first embodiment of the present invention has a separation distance, d2, between the pixel electrode 107 and the common electrode 106. Because of such an addition of the W sub-pixel 100d in this embodiment, d2 is approximately equal to 0.5d1. That is, if the W sub-pixel 100d is added, brightness can be improved to a certain extent, but the light transmission region (transmissive area of the pixel region not blocked by the pixel electrode or the common electrode) is decreased. This is because a unit pixel of this embodiment has four sub-pixels. R, G, B and W, and substantially the same area as the unit pixel of the related art. The additional electrode structure of the W sub-pixel decreases the transmissive area of the unit pixel, which may reduce the increased brightness resulting from the addition of the W sub-pixel.

Figure 3:
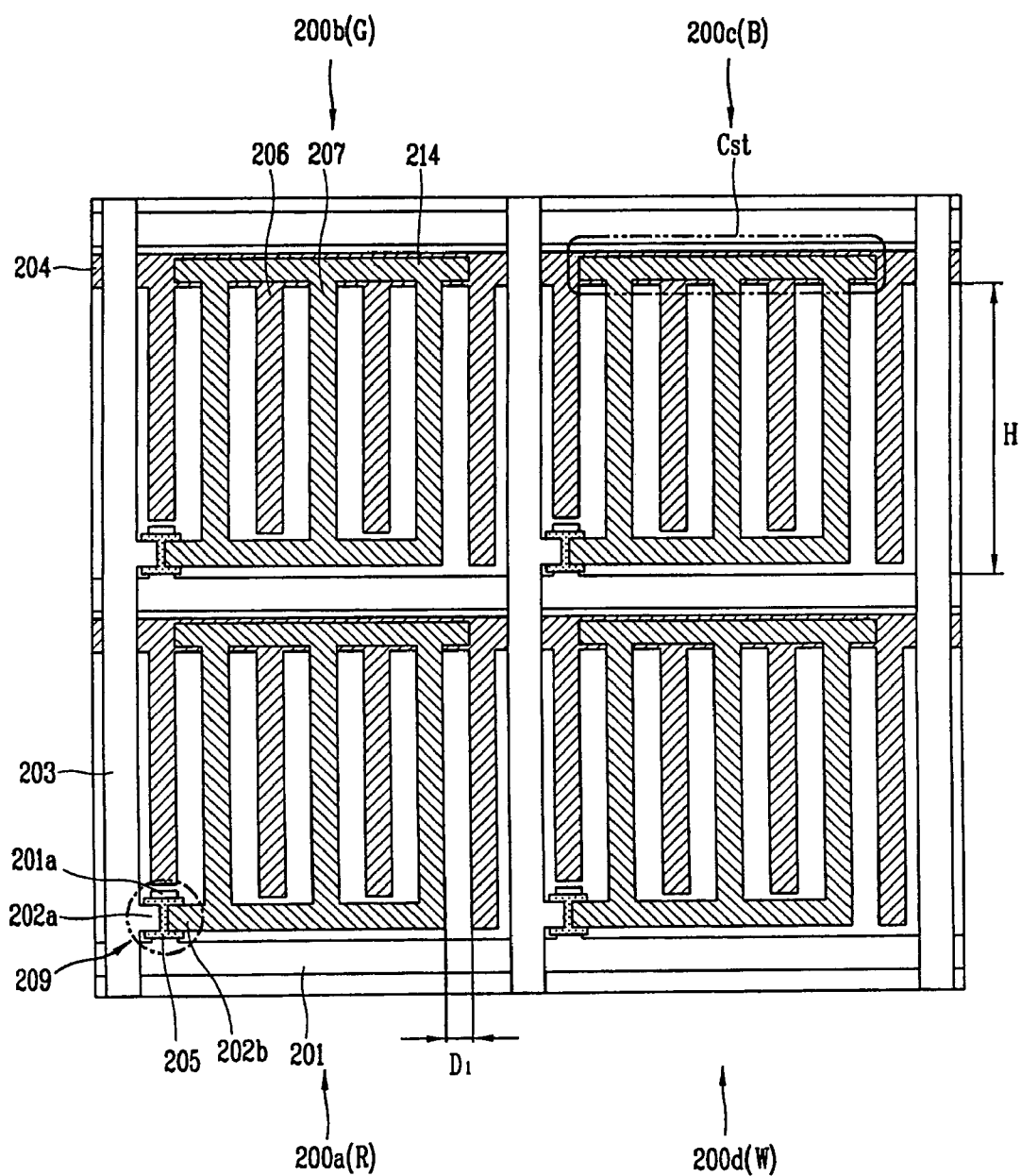
FIG. 3 illustrates an IPS mode LCD device according to a second embodiment of the present invention.

FIG. 3 illustrates a second exemplary embodiment of the present invention. In the second embodiment, sub-pixels R, G, B and W are arranged in a 2×2 matrix form, and each sub-pixel has six transmissive regions between electrodes 206 and 207, wherein each transmissive region that has a width, D1, that is substantially the same as the corresponding width of the related art structure. The sub-pixel arrangement, and the width of the transmission region, D1, improve brightness and aperture ratio relative to the related art.

As illustrated in FIG. 3, the IPS mode LCD device according to the second embodiment has R, G, B and W sub-pixels 200a-200d, each having six transmissive regions, wherein the sub-pixels are arranged in the 2×2 matrix to form a unit pixel (P). The sub-pixels 200a-200d are defined by gate lines 201 and data lines 203, respectively, and are arranged horizontally and vertically. In each sub-pixel 200a-200d is at least one pair of electrodes, a pair including a pixel electrode 207 connected to the pixel electrode line 214, and a common electrode 206 connected to the common line 204. The pixel electrodes 207 may be substantially perpendicularly oriented relative to the pixel electrode line 214, and the common electrode 206 may be substantially perpendicularly oriented relative to the common line 204. The pixel electrodes 207 and the common electrodes 206 may be alternately disposed, and generate an in-plane electric field in the pixel on the application of a voltage. Further, the pixel electrode line 214 may overlap the common line 204 to form a storage capacitor (Cst).

A thin film transistor 209 is disposed as a switching device on the gate line 201. The thin film transistor 209 includes a semiconductor layer 205 formed on the gate line 201; a source electrode 202a formed on the semiconductor layer 205; and a drain electrode 202b facing the source electrode 202a and electrically connected to the pixel electrode line 214. In addition, although not shown in the drawing, a gate insulation layer (not shown) may be deposited on an entire surface of a substrate on which the gate line 201 has been formed. The gate insulation layer insulates the pixel electrode 207 and the common electrode 206 from each other.

In the IPS mode LCD device of this embodiment, a separation distance D1 between the pixel electrode 207 and the common electrode 206 may be the same as d1, the separation distance of the related four-block LCD device illustrated in FIG. 1A. With the sub-pixels 200a-200d arranged in a 2×2 matrix form according to this embodiment, a gate line and a common line are added between the sub-pixels that are disposed vertically, which may result in an aperture ratio 'H' in a vertical direction. Here, 'H' is a value smaller than 'h', a vertical length illustrated in FIG. 1A, by about 15%. However, because two sub-pixels are disposed in a horizontal direction, the light transmission region may be increased by increasing D1 or by further adding a common electrode and a pixel electrode.

By increasing D1, the aperture ratio increasing in the horizontal direction is greater than the aperture ratio decreasing in the vertical direction, thereby improving brightness and aperture ratio.

Figure 4:
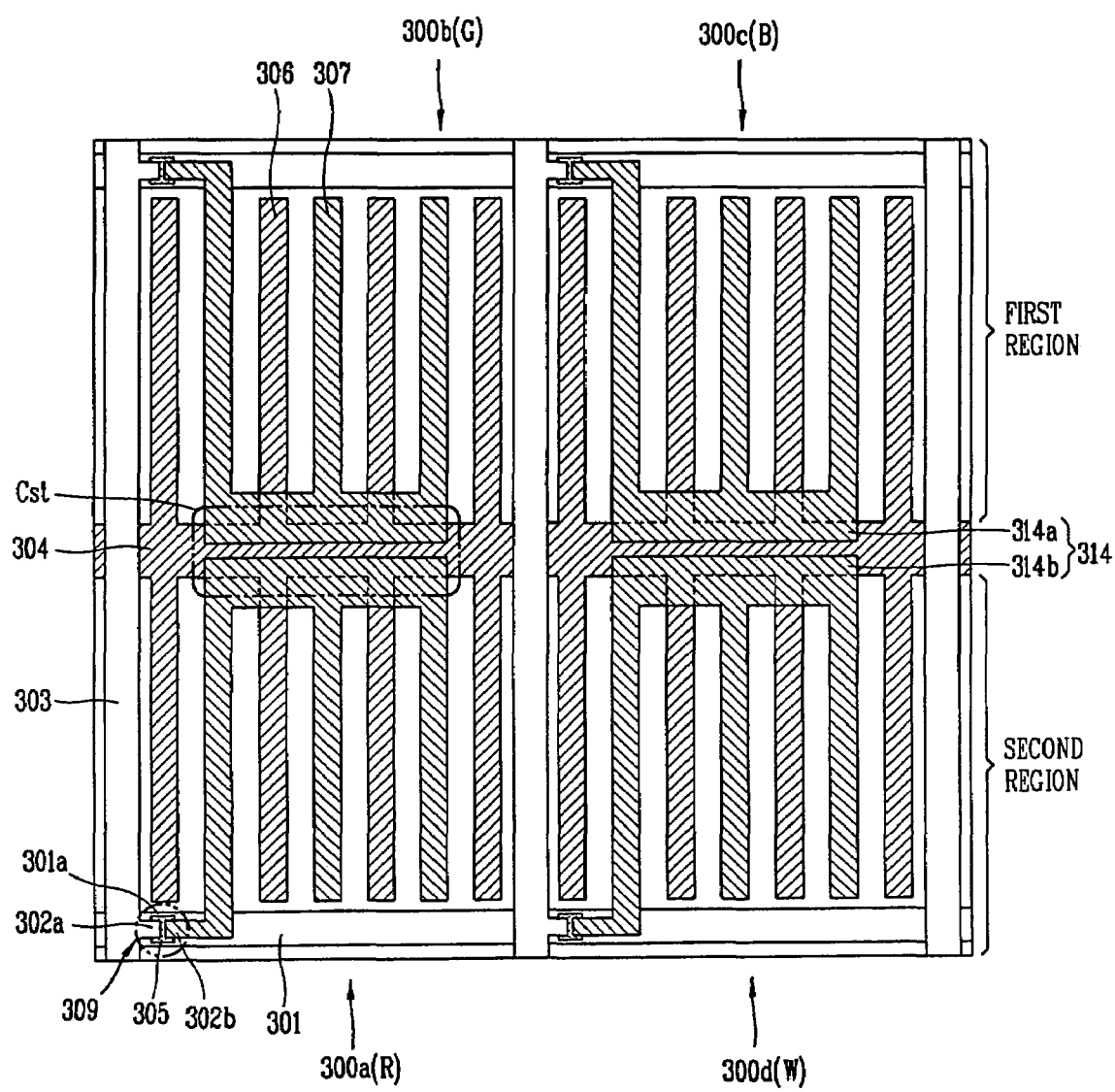
FIG. 4 illustrates an IPS mode LCD device according to a third embodiment of the present invention.

FIG. 4 illustrates a third exemplary embodiment of the present invention, in which the aperture ratio may be improved by making vertically disposed sub-pixels share a common line. The third embodiment is substantially similar to the second embodiment (FIG. 3), with a distinction in the disposition of a common line. This distinction is described below.

As illustrated in FIG. 4, in the IPS mode LCD device according to the third embodiment, a unit pixel is divided into sub-pixels by a common line 304 passing through a center of the pixel (P) parallel to a gate line 301, and R, G, B and W sub-pixels 300a-300d are arranged in a 2×2 matrix form. The region above the common line 304 may be referred to as a first region, and the region below the common line 304 may be referred to as a second region. As illustrated in FIG. 4, the G and B sub-pixels 300b and 300c are disposed in the first region, and R and W sub-pixels 300a and 300d are disposed in the second region.

The common line 304 is electrically connected to at least one common electrode 306 disposed in each sub-pixel, and forms a storage capacitor (Cst) together with a pixel electrode line 314 overlapping the common line 304. As illustrated in FIG. 4, the pixel electrode line 314 overlapping the common line 304 includes a first pixel electrode line 314a electrically connected to a pixel electrode 307 formed in the first region; and a second pixel electrode line 314b electrically connected to a pixel electrode 307 formed in the second region.

The IPS mode LCD device having such a structure can improve the aperture ratio because the sub-pixels disposed at upper and lower portions of the pixel share one common line. The common line is disposed at a boundary line between the first and second regions, and sub-pixels disposed vertically share the common line, thereby reducing a line-formed area.

The aperture ratio may be further improved by making the common electrode and the pixel electrode of a transparent conductive material.

Figure 5:
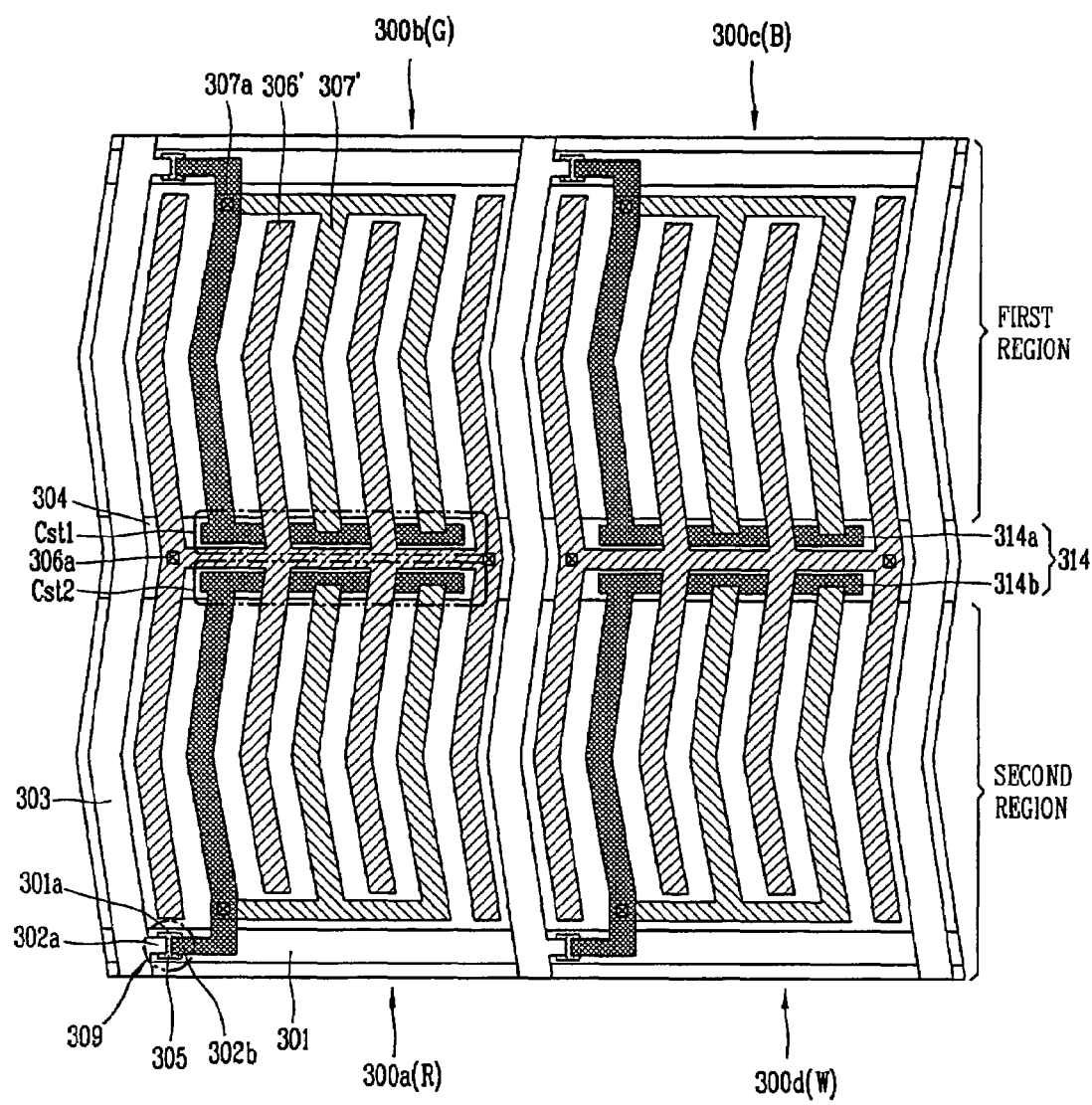
FIG. 5 is a view of an IPS mode LCD device according to a fourth embodiment of the present invention.

FIG. 5 illustrates an exemplary embodiment in which a common electrode 306' and a pixel electrode 307' are made of a transparent conductive material. Materials such as ITO (indium tin oxide) or IZO (indium zinc oxide) or the like may be used for the transparent conductive material. The common electrode 306' and the pixel electrode 307' are formed on different layers from the common line 304 and the pixel electrode line 314, and thus contact holes for electrically connecting them are required. Accordingly, a first contact hole 306a for connecting the common electrode 306' with the common line 304 is formed, and a second contact hole 307a for connecting the pixel electrode 307' with the pixel electrode line 314 is formed. Here, the pixel electrode line 314 is connected to a drain electrode 302b, and the drain electrode 302b is connected to the pixel electrode 307' through the second contact hole 307a, so that the pixel electrode line 314 is connected to the pixel electrode 307' (the pixel electrode line is separately formed in order to form a storage capacitor, and, hereinafter, will be referred to as "storage line").

In the IPS mode LCD device according to this exemplary embodiment, a common line 304 overlapping a first storage line 314a of the first region forms a first storage capacitor (Cst1), and the common line 304 overlapping a second storage line 314b of the second region forms a second storage capacitor (Cst2).

A structure according to this exemplary embodiment may have an improved aperture ratio since the sub-pixels formed at the first and second regions share the common line 304. However, the first and the second storage capacitors (Cst1, Cst2), formed together at the common line, limit the extent to which the width may be reduced.

The aperture ratio may be improved by reducing the width of the common line. In a fifth exemplary embodiment of the present invention, the first storage capacitor (Cst1) of the first region may be formed on a gate line 401, and the second storage capacitor (Cst2) of the second region may be formed on a common line 404, so that a width of the common line 304 is reduced and thus an aperture ratio may be improved while a total storage capacitor is maintained.

Figure 6A:
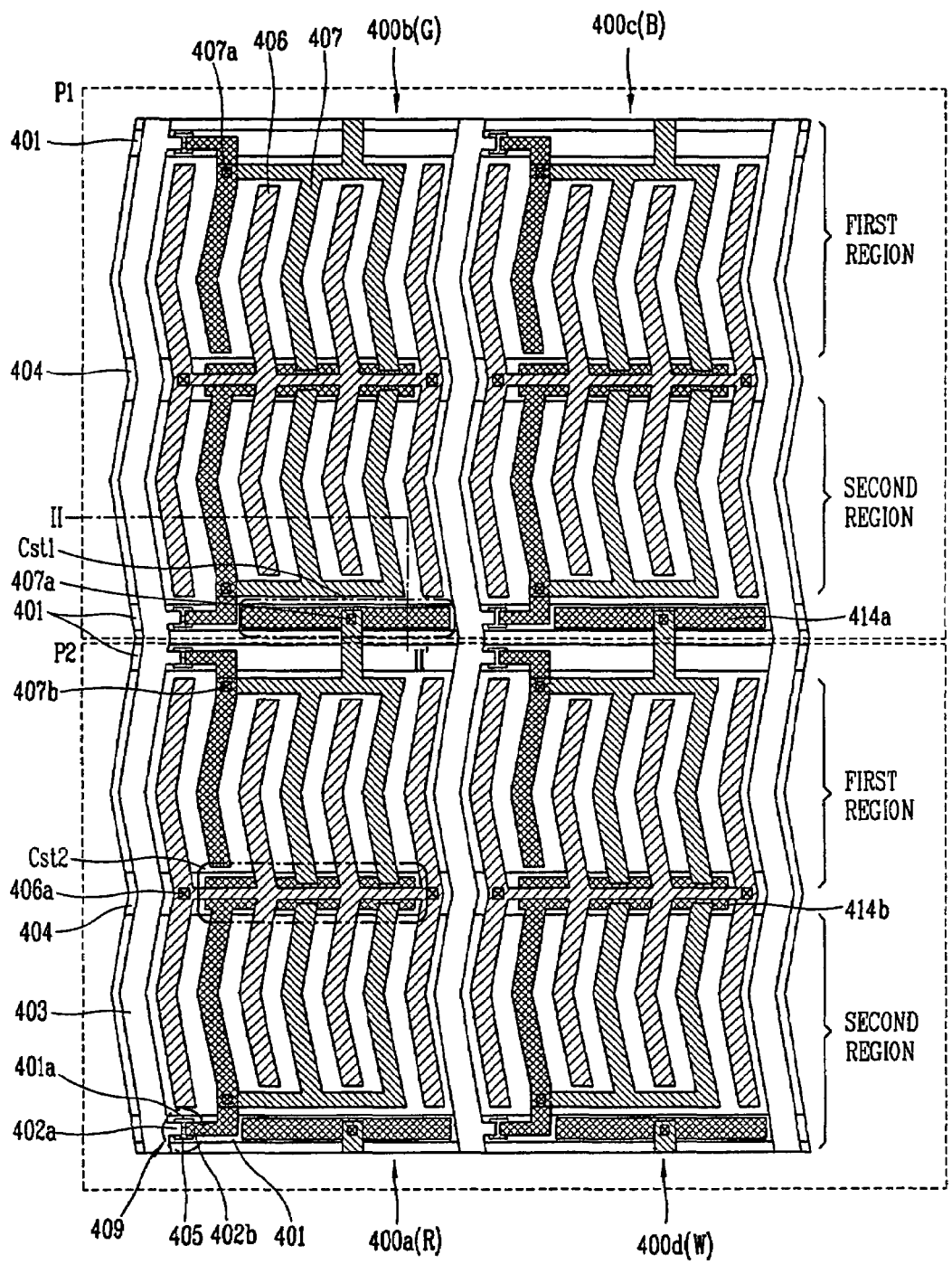
FIGS. 6A and 6B are views illustrating an IPS mode LCD device according to a fifth embodiment of the present invention.
Figure 6B:
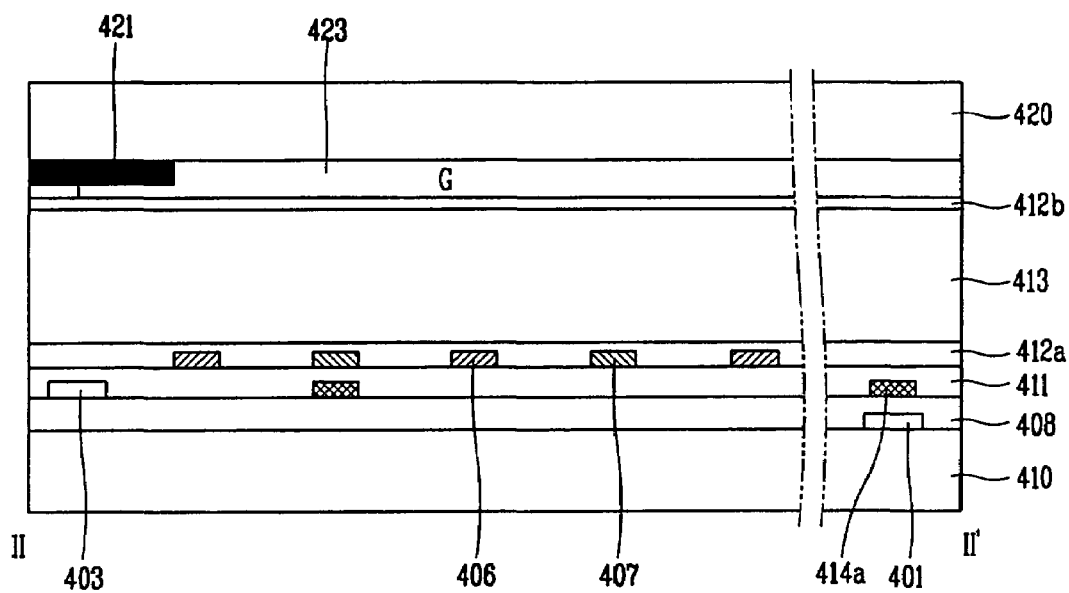

FIGS. 6A and 6B show a fifth embodiment of the present invention. FIG. 6A is a plan view of two pixels (P1, P2) disposed vertically, and FIG. 6B is a view showing a sectional structure taken along line II-II'. In the fifth exemplary embodiment of the present invention, a common line 404 is shared by sub-pixels disposed in the upper and lower regions, a storage capacitor (Cst2) of the sub pixel positioned in the first region is formed on a front gate line 401, and a storage capacitor of the sub-pixel positioned in the second region is formed on common line 404, so that a width of the common line is reduced, thereby improving an aperture ratio. The components of the fifth exemplary embodiment may be substantially similar to those of the fourth embodiment, with exceptions including the position of a common line 404 and a second storage capacitor (Cst2).

For example, as illustrated in FIG. 6A, pixels (P1 and P2) are defined by gate lines 401 and data lines 403, which are respectively disposed horizontally and vertically. The four sub-pixels 400a-400d are defined by a common line 404 passing through the center of the data line 403 perpendicularly. Accordingly, four sub-pixels construct one pixel.

In this exemplary embodiment, a common electrode 406 and a pixel electrode 407 for generating an in-plane electric field in the pixel are disposed in each sub-pixel. The common electrode 406 is connected to a common line 404, and the pixel electrode 407 is connected to a storage line (414a, 414b). Herein, the storage line (414a, 414b) is divided into a first storage line 414a connected with a pixel electrode 407 of a first region and a second storage line 414b connected to a pixel electrode 407 of a second region. The first storage line 414a is disposed on a front gate line 401, and the second storage line 414b is disposed on the common line 404. Accordingly, the first storage line 414a and the gate line 401 form a first storage capacitor (Cst1), having a gate insulation layer 408 interposed between them, and the second storage line 414b and the common line 404 form a second storage capacitor (Cst2), having a gate insulation layer 408 interposed between them.

Further, in the fifth exemplary embodiment, the common line 404 is connected to the common electrode 406 through a first contact hole 406a, and the first storage line 414a is connected to the pixel electrode 407 of the first region through a second contact hole 407a formed on the front end gate line 401. The second storage line 414b is connected to a drain electrode 402b, and the drain electrode 402b is connected to the pixel electrode 407 of the second region through a third contact hole 407b.

The LCD device according to this exemplary embodiment may enable a reduction of the width of the common line by half because the first storage capacitor is formed on the front gate line 401 and the second storage capacitor is formed on the common line 404. Accordingly, the LCD device of the present invention may have an aperture ratio proportionate with the reduced width of the common line.

In addition, by disposing the common electrode and the pixel electrode in a zigzag structure, a multi domain structure providing for substantially symmetric viewing angle characteristics may be formed. The multi domain structure may cancel abnormalities in light transmission, and may minimize color shifting. The data line 403 may also have a zigzag structure similar to that of the common electrode 406 and pixel electrode 407.

According to the fifth exemplary embodiment, as illustrated in FIG. 6B, the gate line 401 may be formed on a transparent first substrate 410, and a gate insulation layer 408 may be applied thereon. The data line 403 and the first storage line 414a may be formed on the gate insulation layer 408. A passivation layer 411 may be deposited thereon, and the common electrode 406 and the pixel electrode 407 for generating an in-plane electric field may be formed on the passivation layer 411, and a first alignment film 412a may be applied thereon.

As described above, because the common electrode 406 and the pixel electrode 407 are formed on the same plane, an electric field between the two electrodes becomes stronger, and liquid crystal molecules in a liquid crystal layer can be switched at a higher speed by such a strong electric field.

The present invention does not limit positions of the common electrode 406 and the pixel electrode 407. The common electrode 406 and the pixel electrode 407 may be formed on different planes. For example, the common electrode 406 may be formed on a substrate together with the common line 404, and the pixel electrode 407 may be formed on a gate insulation layer 408 together with the first storage line 414a.

Also, in this exemplary embodiment, a black matrix 421 for preventing leakage of light and R, G, B, and W color filters 423 for implementing colors are formed on a transparent second substrate 420, and a second alignment film 412b is applied thereon. In addition, a liquid crystal layer 413, which is to be driven by an in-plane electric field generated between the pixel electrode 407 and the common electrode 406, is disposed between the first and the second substrates 410 and 420.

The present invention may include a common line 404 that defines a first and second region of sub-pixels, wherein the sub-pixels may be different in area. The first region contains G and B sub-pixels 400b and 400c, and the second region contains R and W sub-pixels 400a and 400d. The G sub-pixel 400b of the first region and the R sub-pixel 400a of the second region are defined by the common line 404. Given the placement and shape of the common line 404, the R sub-pixel 400a and the G sub-pixel 400b may have substantially the same area, and thereby may have a sub-pixel area ratio (R/G) approximately equal to one. The common line 404 may be designed such that the B sub-pixel 400c of the first region and the W sub-pixel 400d of the second region are different in area. That is, the area of the B sub-pixel 400c is larger than the W sub-pixel 400d, thereby having a sub-pixel area ratio (B/W) greater than 1. Such a difference in area can be obtained since the common line 404 may be shifted to be disposed further toward the second region between the B sub-pixel 400c and the W sub-pixel 400d. In other words, the common line 404 is disposed substantially centrally between the R sub-pixel 400a and the G sub-pixel 400b, and then is shifted toward the W sub-pixel 400d where it is disposed between the W sub-pixel 400c and the W sub-pixel 400d.

The B sub-pixel 400c and the W sub-pixel 400d may be made to be different in area so that the sum of the brightnesses of the R, G and B sub-pixels 400a-400c becomes substantially the same as the brightness of the W sub-pixel 400d. To achieve this, the area of the W sub-pixel 400d is reduced.

Also, as the area of the W sub-pixel 400d decreases, the area of the B sub-pixel 400c increases proportionately. Such an increase little affects the sum of brightness of the R, G and B sub-pixels (400a-400c). Namely, extent of contribution of the R, G and B sub-pixels 400a-400c in relation to overall brightness are approximately 35%, 55% and 10%, respectively. As such, the contribution of the B sub-pixel in relation to the overall brightness is very small. Accordingly, despite the increased area of the B sub-pixel 400c, the sum of the brightnesses of the R, G and B sub-pixels is little changed, and the brightness of the W-sub-pixel 400d is decreased. Hence, the difference between the sum of the brightnesses of the R, G and B sub-pixels 400a-400c and the brightness of the W sub-pixel may be minimized.

Figure 7A:
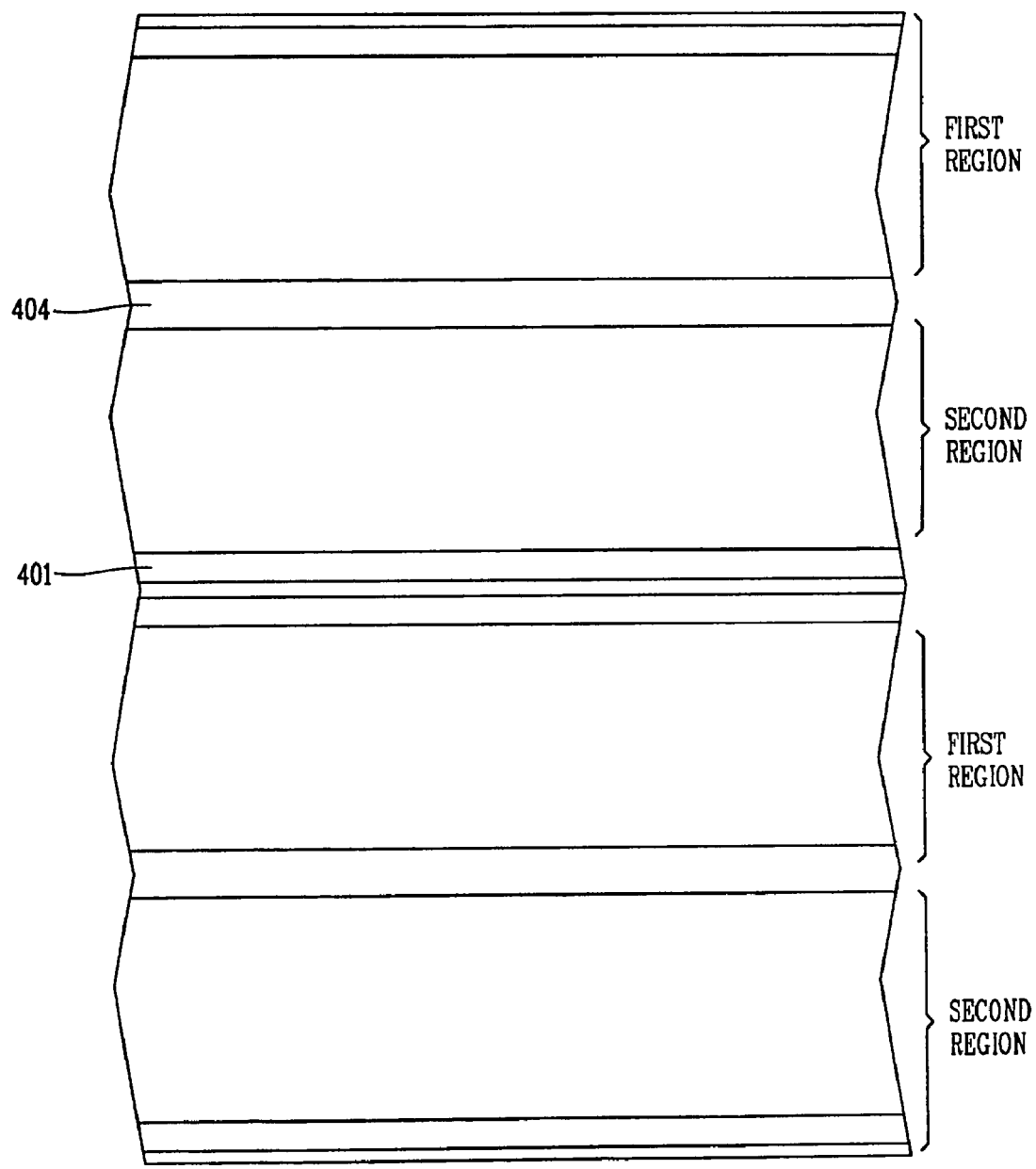
FIGS. 7A to 7C are views of an IPS mode LCD device according to the present invention.
Figure 7B:
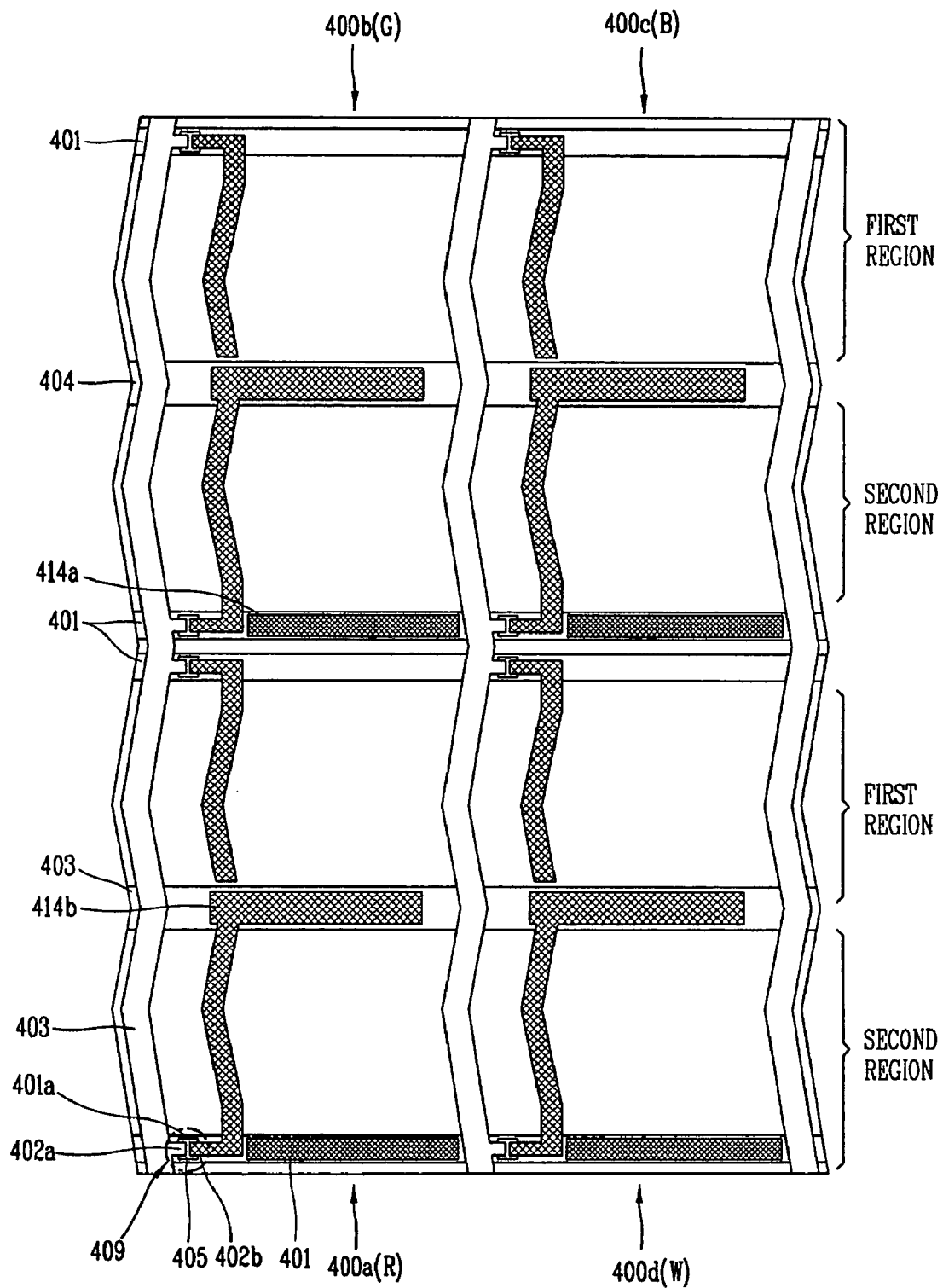
Figure 7C:
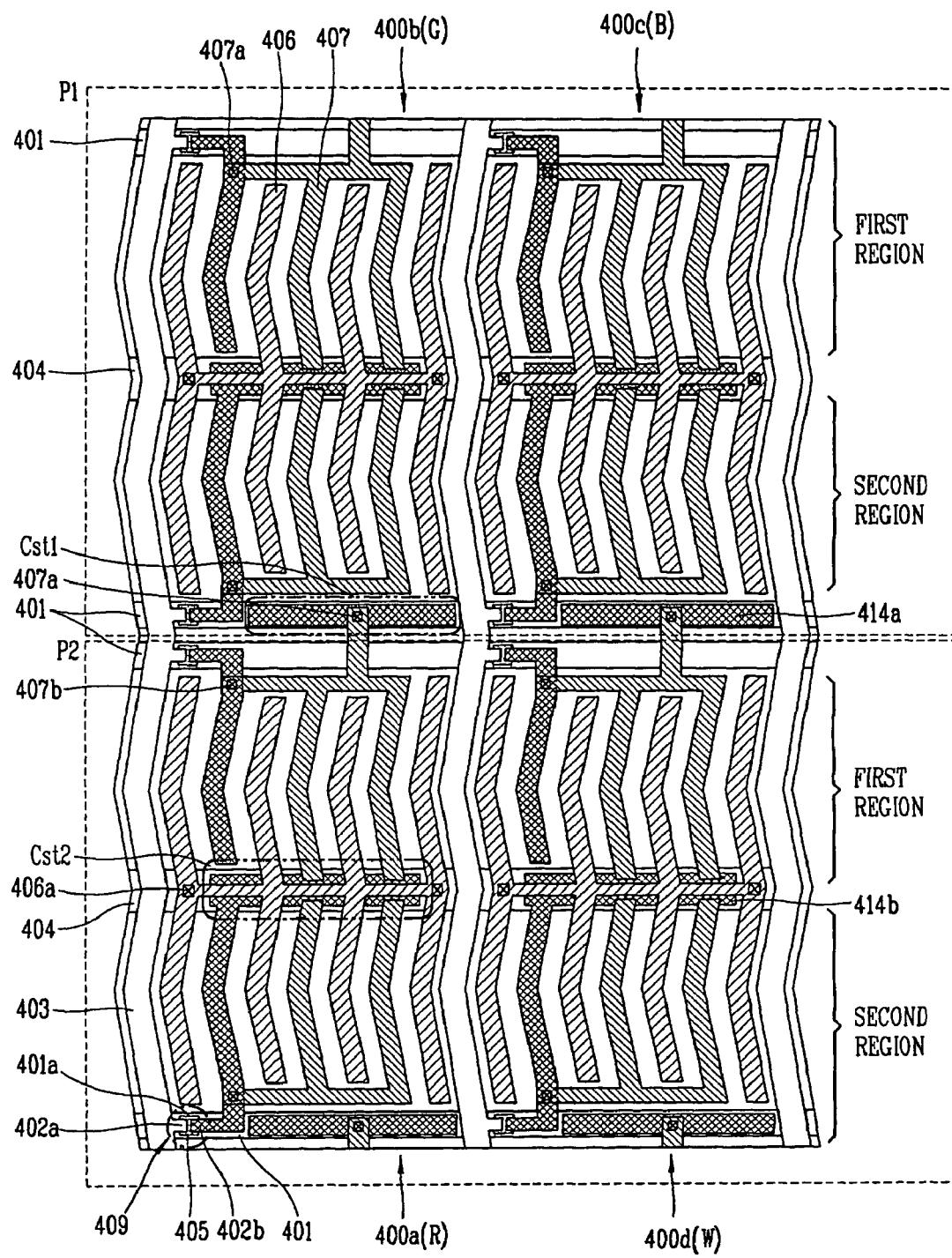

An exemplary fabrication process of an IPS mode LCD device depicted in the fifth embodiment (FIGS. 6A and 6B) is described as follows. FIGS. 7A to 7C are plan views of a fabrication method of an LCD device depicted in the fifth embodiment.

First, as illustrated in FIG. 7A, a transparent insulation substrate 410, such as glass, is prepared in which a metal such as Cu, Ti, Cr, Al, Mo, Ta, Al alloy, which is deposited on the substrate 410 through a method such as sputtering. The metal is patterned to form gate lines 401 and a common line 404 dividing a region between the gate lines 401 into a first region and a second region. The common line 404 is formed substantially parallel to the gate line 401.

Thereafter, SiNx, SiOx or a similar insulating material is deposited on an entire surface of the substrate 410 including the gate line 401 and the common line 404 by a plasma CVD method, or a similar oxide deposition process, thereby forming a gate insulation layer (not shown).

As illustrated in FIG. 7B, amorphous silicon and n⁺ amorphous silicon is formed on the gate insulation layer (not shown) and patterned to create a semiconductor layer 405 on the gate line 401. Next, a metal such as Cu, Mo, Ta, Al, Cr, Ti, Al alloy is deposited on the semiconductor layer 405 and the gate insulation layer (not shown) through a sputtering method and patterned to form the following: a data line 403 disposed substantially perpendicularly to the gate line 401 and the common line 404; source/drain electrodes 402a/402b formed on the semiconductor layer 405 and isolated from each other at a prescribed interval; a first storage line 414a overlapping a front gate line 401 and forming a first storage capacitor (Cst1); and a second storage line 414b overlapping the common line 404, connected to the drain electrode 402b and forming a second storage capacitor (Cst2).

Next, an inorganic material such as SiNx or SiOx or an organic material such as benzocyclobutene and acryl is applied on the substrate where a thin film transistor 409 has been formed. Then, contact holes 406a, 407a and 407b are formed by removing a portion of the passivation layer disposed on the common line 404, the gate line 401 and the drain electrode 402b, respectively.

As illustrated in FIG. 7C, a transparent conductive material such as ITO (indium tin oxide) or IZO (indium zinc oxide) is deposited on the passivation layer 411 and patterned to form a common electrode 406 and a pixel electrode 407. The common electrode 406 may be connected to the common line 404 through the first contact hole 406a, and a pixel electrode 407 may be connected to the first storage line 414a and the drain electrode 402b through the second and third contact holes 407a and 407b, respectively.

Next, the first substrate fabricated through the exemplary process, and a second substrate on which a color filter is formed, are attached together. The common electrode 406 and the pixel electrode 407 may be formed on different layers, and the two electrodes may be made of an opaque metal as well as a transparent material.

In the quad type IPS mode LCD device according to the present invention described as above, sub-pixels disposed vertically share a common line, a storage capacitor of the upper sub-pixel (Cst1) is formed on a front gate line 401, and a storage capacitor of the lower sub-pixel (Cst2) is formed on a common line 404, thereby reducing a width of the common line as much as possible. Accordingly, the area occupied by the common line in a pixel is reduced, thereby improving the aperture ratio.

As described, in an IPS mode LCD device according to the present invention, brightness can be improved by disposing R, G B and W sub-pixels in a 2×2 matrix form. Also, in the present invention, an aperture ratio can be improved because sub-pixels, which are disposed vertically, share one common line. In addition, according to the present invention, sub-pixels, which are disposed vertically, share a common line, a storage capacitor of an upper sub-pixel is formed on a front gate line, and a storage capacitor of a lower sub-pixel is formed on a common line, thereby effectively reducing a width of the common line and further improving the aperture ratio.

It will be apparent to those skilled in the art that various modifications and variation can be made in the present invention without departing from the spirit or scope of the invention. Thus it is intended that the present invention cover the modifications and variations of this invention provided they come within the scope of the appended claims and their equivalents.

What is claimed is:

1. An in plane switching mode liquid crystal display device, comprising:
   a first substrate and a second substrate;
   a plurality of gate lines disposed horizontally on the first substrate;
   a plurality of data lines disposed vertically on the first substrate;
   a common line between the gate lines, the gate lines, the data lines and the common line defining a first to a fourth sub-pixels arranged in a 2×2 matrix form;
   a thin film transistor at an intersection of the gate lines and the data lines in each sub-pixel;
   at least one pair of a common electrode and a pixel electrode disposed in each of the sub-pixels, the pixel electrode at each sub-pixel being connected to the thin film transistor thereof;
   two first storage lines respectively connected to the pixel electrodes of the upper two sub-pixels of 2×2 matrix form and disposed on the gate line;
   two second storage lines respectively connected to the pixel electrodes of the lower two sub-pixels of 2×2 matrix form and disposed on the common line; and
   a liquid crystal layer formed between the first and the second substrates.

2. The device of claim 1, wherein the pixel electrode and the common electrode include a transparent material.

3. The device of claim 2, wherein the transparent material includes indium tin oxide (ITO).

4. The device of claim 1, wherein the first to the fourth sub-pixels are Red (R), Green (G), Blue (B) and White (W) pixels, respectively.

5. The device of claim 1, wherein the gate line and the first storage lines form two first storage capacitors.

6. The device of claim 1, wherein the common line and the two second storage lines form two second storage capacitors.

7. The device of claim 1, wherein the thin film transistor includes:
   a gate electrode;
   a gate insulation layer formed on an entire surface of a substrate including the gate electrode;
   a semiconductor layer formed on the gate insulation layer; and
   a source and a drain electrodes formed on the semiconductor layer.

8. The device of claim 1, wherein the common electrode and the pixel electrode each have a zigzag structure.

9. The device of claim 8, wherein the data lines have a zigzag structure.

10. The device of claim 1, wherein the common electrode and the pixel electrode are formed on the same plane.

11. The device of claim 1, wherein the common line is shared by sub-pixels of the 2×2 matrix form.

12. The device of claim 1, further comprising a gate insulation layer interposed between the gate line and the first storage lines and between the common line and the second storage lines.

13. A fabrication method of an in plane switching mode liquid crystal display device comprising:
   providing a first substrate and a second substrate;
   forming a plurality of gate lines and a common line parallel to and between the gate lines;
   forming a plurality of data lines disposed perpendicularly to the gate lines and defining R, G, B, and W sub-pixels together with the gate lines and the common line; a thin film transistor at each of the R, G, B, and W sub-pixels;
   two first storage lines overlapping a gate line within the plurality of gate lines and forming two first storage capacitors, the two first storage lines being respectively connected to the thin film transistors in two of the sub-pixels; and two second storage lines overlapping the common line and forming two second storage capacitors, the two second storage lines being respectively connected to the thin film transistors at the other two of the sub-pixels;

forming a passivation layer on an entire surface of the substrate including the first and second storage lines; and forming a common electrode and a pixel electrode on the passivation layer.

14. The method of claim 13, wherein the common electrode and the pixel electrode are made of a transparent conductive material.

15. The method of claim 14, wherein the transparent conductive material includes indium tin oxide (ITO).

16. The method of claim 13, further comprising forming a contact hole for exposing the common line and the gate line by etching a part of the passivation layer.

17. The method of claim 13, wherein the providing the second substrate includes:

forming a black matrix on a transparent second substrate; and forming a color filter on the second substrate.

18. The method of claim 13, wherein the common electrode and the pixel electrode each have a zigzag structure.

* * * * *